(12) United States Patent
Nohara et al.

(10) Patent No.: US 11,047,366 B2
(45) Date of Patent: Jun. 29, 2021

(54) DRIVING DEVICE, DRIVING DEVICE UNIT AND WIND TURBINE

(71) Applicant: NABTESCO CORPORATION, Tokyo (JP)

(72) Inventors: Osamu Nohara, Gifu-ken (JP); Shigeru Hosoda, Gifu-ken (JP); Kei Kato, Gifu-ken (JP); Haruna Osako, Gifu-ken (JP)

(73) Assignee: NABTESCO CORPORATION, Tokyo (JP)

( * ) Notice: Subject to any disclaimer, the term of this patent is extended or adjusted under 35 U.S.C. 154(b) by 32 days.

(21) Appl. No.: 16/464,091

(22) PCT Filed: Nov. 30, 2017

(86) PCT No.: PCT/JP2017/043049
§ 371 (c)(1),
(2) Date: May 24, 2019

(87) PCT Pub. No.: WO2018/105484
PCT Pub. Date: Jun. 14, 2018

(65) Prior Publication Data
US 2019/0293055 A1 Sep. 26, 2019

(30) Foreign Application Priority Data
Dec. 7, 2016 (JP) .............................. JP2016-237746

(51) Int. Cl.
*F03D 7/02* (2006.01)
*F03D 7/04* (2006.01)
(Continued)

(52) U.S. Cl.
CPC ........... *F03D 17/00* (2016.05); *F03D 7/0244* (2013.01); *F03D 7/0264* (2013.01); *F03D 7/04* (2013.01);
(Continued)

(58) Field of Classification Search
CPC .... F03D 7/0244; F03D 7/0264; F03D 7/0204; F03D 7/04; F03D 17/00; F03D 15/10;
(Continued)

(56) References Cited

U.S. PATENT DOCUMENTS 8,242,618 B2 * 8/2012 Numajiri ............... F03D 7/0204
290/44
8,823,200 B2 * 9/2014 Kodama ............... F03D 7/0204
290/55
(Continued)

FOREIGN PATENT DOCUMENTS

EP 2708738 A1 3/2014
EP 2902622 A1 * 8/2015 ........... F03D 7/0204
(Continued)

OTHER PUBLICATIONS

Notice of Reasons for Refusal dated Jun. 30, 2020 issued in corresponding Japanese Patent Application No. 2016-237746 with English translation.
(Continued)

Primary Examiner — Igor Kershteyn
(74) Attorney, Agent, or Firm — Pillsbury Winthrop Shaw Pittman, LLP (57) ABSTRACT

Damage to a driving device or a ring gear or both due to an excessive force at a meshing portion therebetween is effectively prevented.
In the embodiment described above, a driving device includes a driving device body that is provided in one structure at a movable section of a wind turbine and has a drive gear meshing with a ring gear provided in the other structure at the movable section, and an abnormality detection unit that monitors a force generated between the ring gear and the drive gear or the state of the driving device body or monitors both of the face and the state. Output from the
(Continued)

drive gear of the driving device body to the ring gear is stopped when the abnormality detection unit detected an abnormality.

10 Claims, 7 Drawing Sheets

(51) Int. Cl.
  *F03D 15/10* (2016.01)
  *F03D 17/00* (2016.01)
  *F03D 80/80* (2016.01)
(52) U.S. Cl.
  CPC .............. *F03D 15/10* (2016.05); *F03D 80/88* (2016.05); *F05B 2260/4031* (2013.01); *F05B 2260/74* (2013.01); *F05B 2260/80* (2013.01); *F05B 2260/90* (2013.01); *Y02E 10/72* (2013.01)
(58) Field of Classification Search
  CPC .............. F03D 80/88; F05B 2260/4031; F05B 2260/74; F05B 2260/80; F05B 2260/90; Y02E 10/72
  See application file for complete search history.

(56) References Cited

U.S. PATENT DOCUMENTS

| | | | |
|---|---|---|---|
| 9,261,073 B2* | 2/2016 | Blake | ................ C25B 1/04 |
| 2008/0131279 A1 | 6/2008 | Behnke et al. | |
| 2011/0299975 A1* | 12/2011 | Pechlivanoglou | .... F03D 7/0204 415/123 |
| 2012/0242085 A1* | 9/2012 | Garfinkel | ............. F03D 7/0204 290/44 |
| 2013/0272842 A1* | 10/2013 | Juhl | ..................... F03D 7/0204 415/1 |

FOREIGN PATENT DOCUMENTS

| | | |
|---|---|---|
| EP | 2902622 A1 | 8/2015 |
| EP | 3078851 A1 | 10/2016 |
| JP | 2001-150253 A | 6/2001 |
| JP | 2005-105941 A | 4/2005 |
| JP | 2005-113899 A | 4/2005 |
| JP | 2009-302475 A | 12/2009 |
| JP | 2014-019344 A | 2/2014 |
| JP | 2015-098894 A | 5/2015 |
| JP | 2015-108358 A | 6/2015 |
| JP | 2015-140777 A | 8/2015 |
| JP | 2016-146738 A | 8/2016 |
| WO | 2010/047064 A1 | 4/2010 |
| WO | 2016/181729 A1 | 11/2016 |

OTHER PUBLICATIONS

First Office Action dated May 8, 2020 issued in corresponding Chinese Patent Application No. 201780072981.2 with English translation (15 pgs.).
English translation International Preliminary Report on Patentability and Written Opinion of the International Searching Authority PCT/JP2017/043049 dated Jun. 11, 2019.
International Search Report dated Feb. 13, 2018 issued in corresponding International Application No. PCT/JP2017/043049 with English translation.
Extended European Search Report dated Jun. 29, 2020 issued in corresponding European Patent Application No. 17877554.0 (6 pgs.).
Notice of Reasons for Refusal dated Jan. 5, 2021, issued in corresponding Japanese Patent Application No. 2016-237746 with English translation (10 pgs.).
Second Office Action dated Feb. 22, 2021, issued in corresponding Chinese Patent Application No. 201780072981.2 with English translation (13 pgs.).

* cited by examiner

DRIVING DEVICE, DRIVING DEVICE UNIT AND WIND TURBINE

CROSS-REFERENCE TO RELATED APPLICATIONS

This Application is the U.S. National Stage of PCT/JP2017/043049, filed Nov. 30, 2017, which claims priority to Japanese Patent Application No. 2016-237746 filed Dec. 7, 2016. The contents of each of which is incorporated herein by reference in its entirety.

TECHNICAL FIELD

The present invention relates to a driving device and a driving device unit used for a movable section of a wind turbine, and the wind turbine.

BACKGROUND

A wind turbine used as a wind power generator has been known as disclosed in, for example, Japanese Patent Application Publication 2015-140777. The wind turbine includes a nacelle turnably installed at the top of a tower and in which a generator and the like are disposed, and a blade installed rotatably relative to a rotor (hub, main shaft) attached to the nacelle. The wind turbine has a yaw or pitch driving device that rotationally drives one structure relative to the other structure at the movable section of the wind turbine. The yaw driving device turns the nacelle, which is the one structure, relative to the tower, which is the other structure, depending on the wind direction. The pitch driving device adjusts a pitch angle of the blade by turning the shaft of the blade, which is the one structure, relative to the rotor in the nacelle, which is the other structure.

When there is deterioration of the driving device itself, gusts and the like, a large force is generated at a meshing portion between a drive gear, which is an output portion of the driving device, and a ring gear meshing with the drive gear. A plurality of driving devices are usually provided in a single movable section of the wind turbine. When trouble occurs in one of the plurality of driving devices, a high load tends to be imposed in the meshing portion between the drive gear and the ring gear of one or more of the driving devices. When the force generated at the meshing portion becomes large, the driving device or ring gear may be broken. If the driving device is broken, it necessary to replace part or all of the driving device. If the ring gear or a structure around the ring gear is broken, a large-scale repair work will be required, and the operation of the wind turbine has to be stopped for a long period of time.

SUMMARY

In order to address this kind of trouble, Japanese Patent Application Publication 2015-140777 proposes to drop the drive gear from the driving device when a control current of the driving device exceeds the rated value. However, when a gust of wind blows, for example, a large force is generated at the meshing portion between the driving device and the ring gear even when the driving device is stopped and no control current flows therein. Moreover, the time from when a high load is generated to when a damage occurs in the driving device may be extremely short, such as several milliseconds. Monitoring the control current alone cannot prevent the damage occurrence.

The invention has been made in view of the above, one objective is to prevent the occurrence of damage to at least the driving device or the ring gear or both due to an excessive force at the meshing portion between the driving device and the ring gear. Among others, the invention endeavors to effectively avoid the damage that cannot be sufficiently avoided only by monitoring the control current.

A driving device according to one aspect of invention includes a driving device body having a drive gear that is provided in one structure at a movable section of a wind turbine and meshes with a ring gear provided in another structure at the movable section of the wind turbine, and an abnormality detection unit for monitoring at least one selected from the group consisting of a force generated between the ring gear and the drive gear and a state of the driving device body. Output from the drive gear of the driving device body to the ring gear is stopped when the abnormality detection unit detected an abnormality.

In the driving device, the driving device body may include a brake mechanism that brakes rotation transmitted to the drive gear or rotation output from the drive gear, and the abnormality detection unit may monitor operation of the brake mechanism.

In the driving device, the driving device body may include a brake mechanism that brakes rotation transmitted to the drive gear or rotation output from the drive gear, and a brake by the brake mechanism on the rotation may be released when the abnormality detection unit detected an abnormality.

A driving device according to another aspect of the invention includes a driving device body having a drive gear and a brake mechanism. The drive gear is provided in one structure at a movable section of a wind turbine and meshes with a ring gear provided in another structure at the movable section of the wind turbine. The brake mechanism brakes rotation transmitted to the drive gear or rotation output from the drive gear. The driving device further includes an abnormality detection unit for monitoring operation of the brake mechanism. Output from the drive gear of the driving device body to the ring gear may be stopped when the abnormality detection unit detected an abnormality.

In the driving device, a brake by the brake mechanism on the rotation may be released when the abnormality detection unit detected an abnormality.

A driving device unit according to yet another aspect of invention includes a plurality of driving devices provided in a single movable section of a wind turbine. Each of the plurality of driving devices is any one of the above-described driving devices. The abnormality detection unit is separately provided for each driving device. When one abnormality detection unit detected an abnormality, output to the ring gear from the drive gear in the driving device having the abnormality detection unit which detected the abnormality is stopped, and output to the ring gear from the drive gear(s) in the driving device(s) other than the driving device having the abnormality detection unit which detected the abnormality is also stopped.

In the driving device unit, when one abnormality detection unit detected an abnormality, a brake by the brake mechanism on rotation may be released in the driving device having the abnormality detection unit which detected the abnormality, and a brake by the brake mechanism(s) may be released also in the driving device(s) other than the driving device having the abnormality detection unit which detected the abnormality.

A wind turbine according to yet another aspect of the invention includes any of the above-described driving devices or any of the above-described driving device unit.

According to the aspects of the invention, it is possible to effectively prevent damage to at least a driving device or a ring gear or both due to an excessive force at a meshing portion therebetween.

DESCRIPTION OF THE PREFERRED EMBODIMENTS

An embodiment of the present invention will now be described with reference to the appended drawings. In the drawings, for the sake of ease of illustration and understanding, a scale size, a dimensional ratio, and so on are altered or exaggerated as appropriate from actual values.

Figure 1:
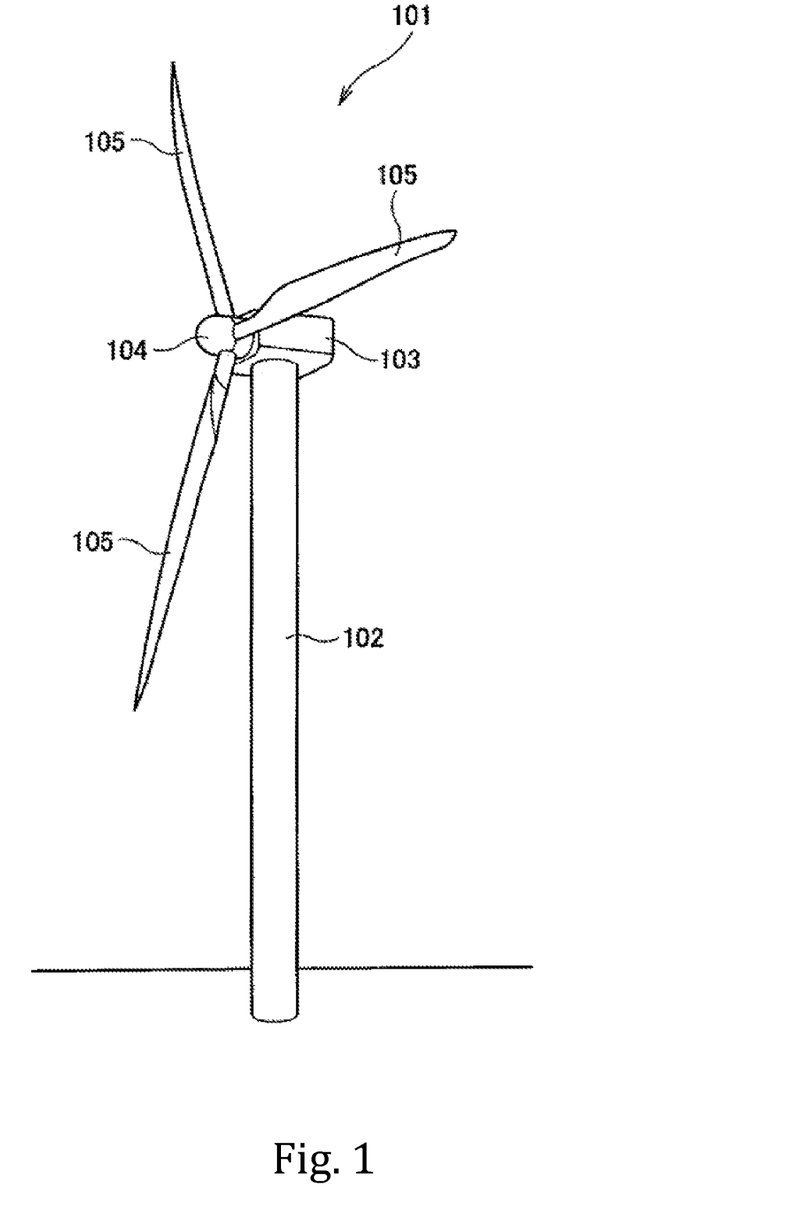
FIG. 1 is a perspective view of a wind turbine according to an embodiment of the invention.
Figure 2:
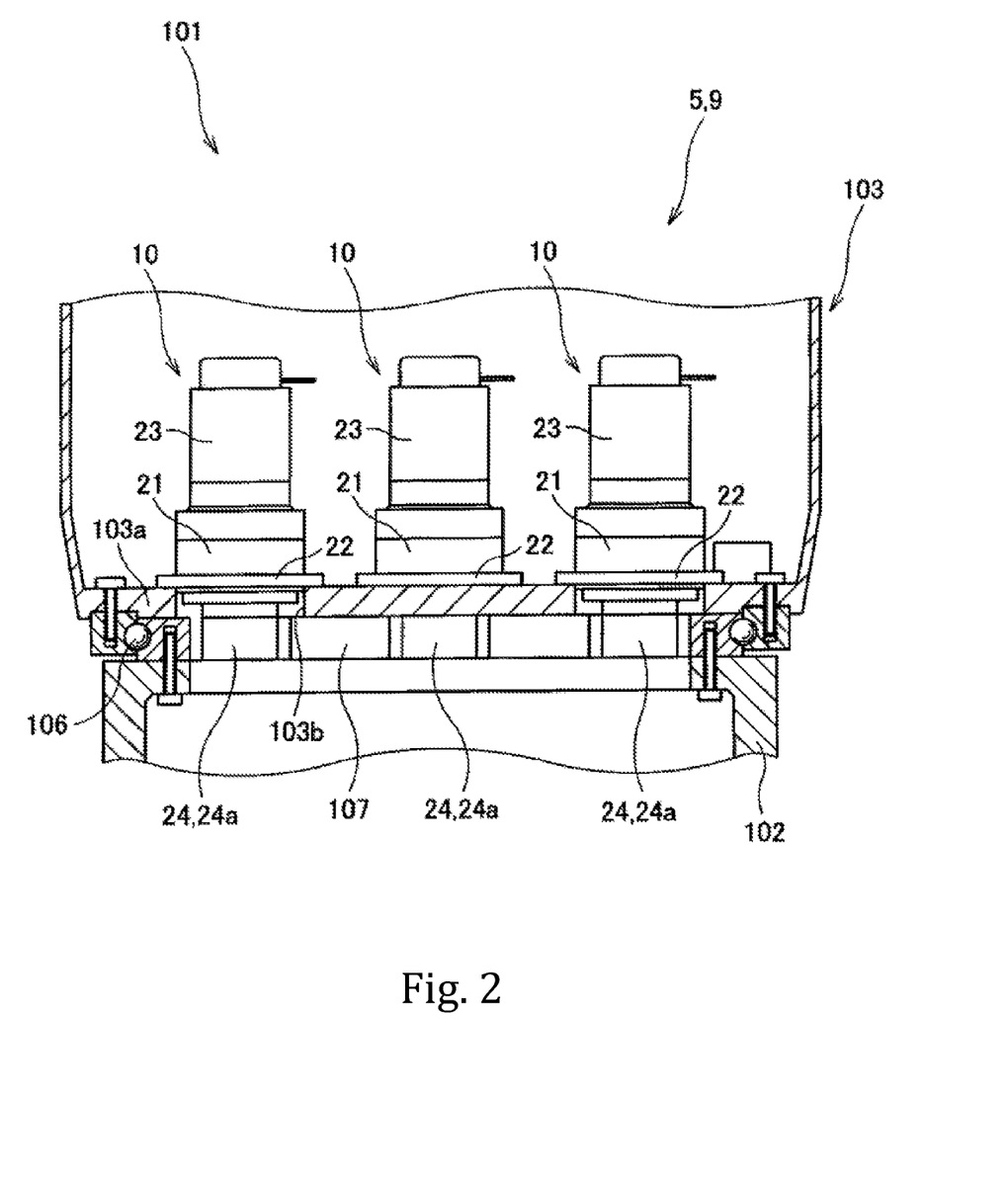
FIG. 2 is a sectional view of a part of a tower and nacelle of the wind turbine of FIG. 1.
Figure 3:
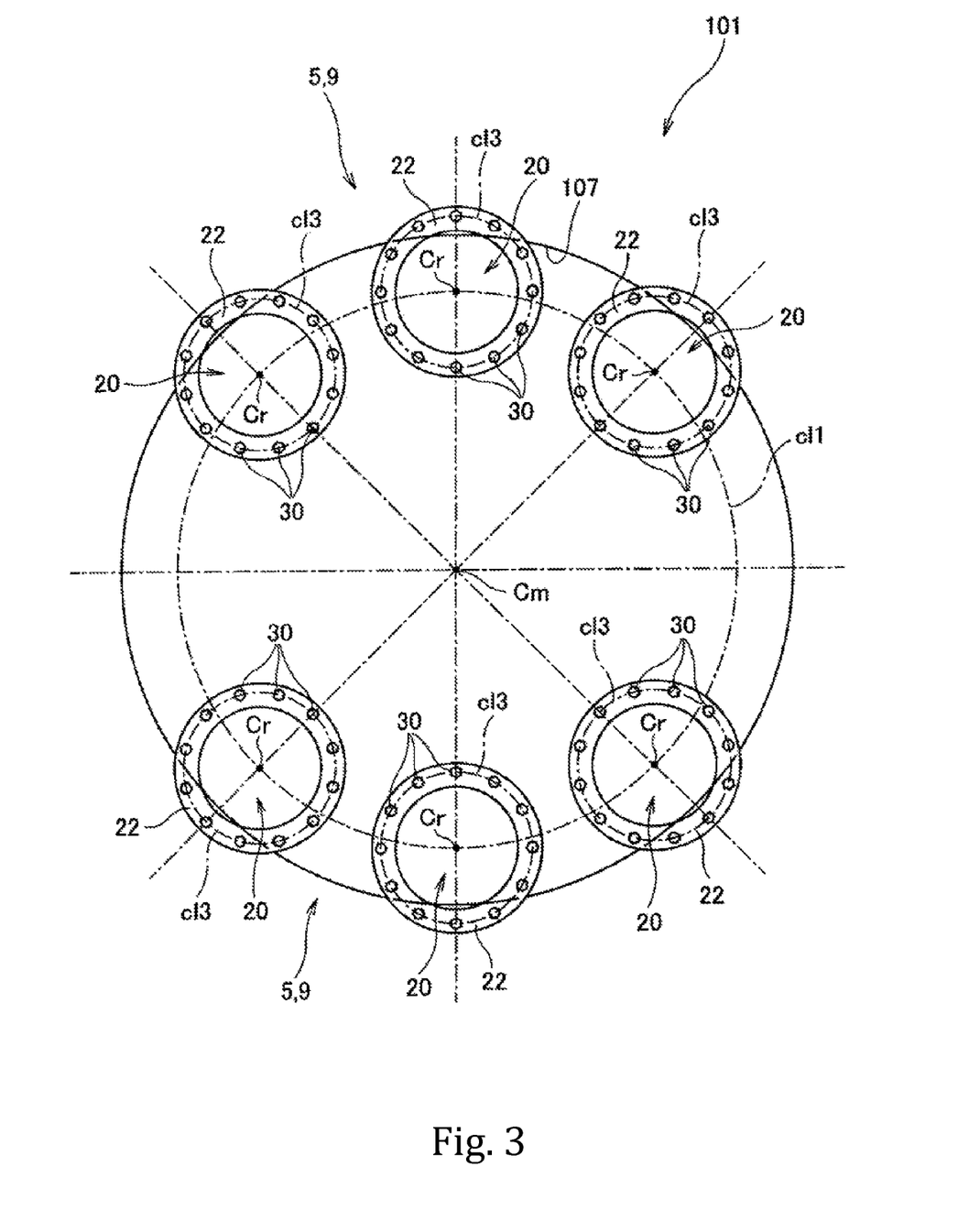
FIG. 3 is a plan view showing an arrangement of a driving device in a movable part shown in FIG. 2.
Figure 4:
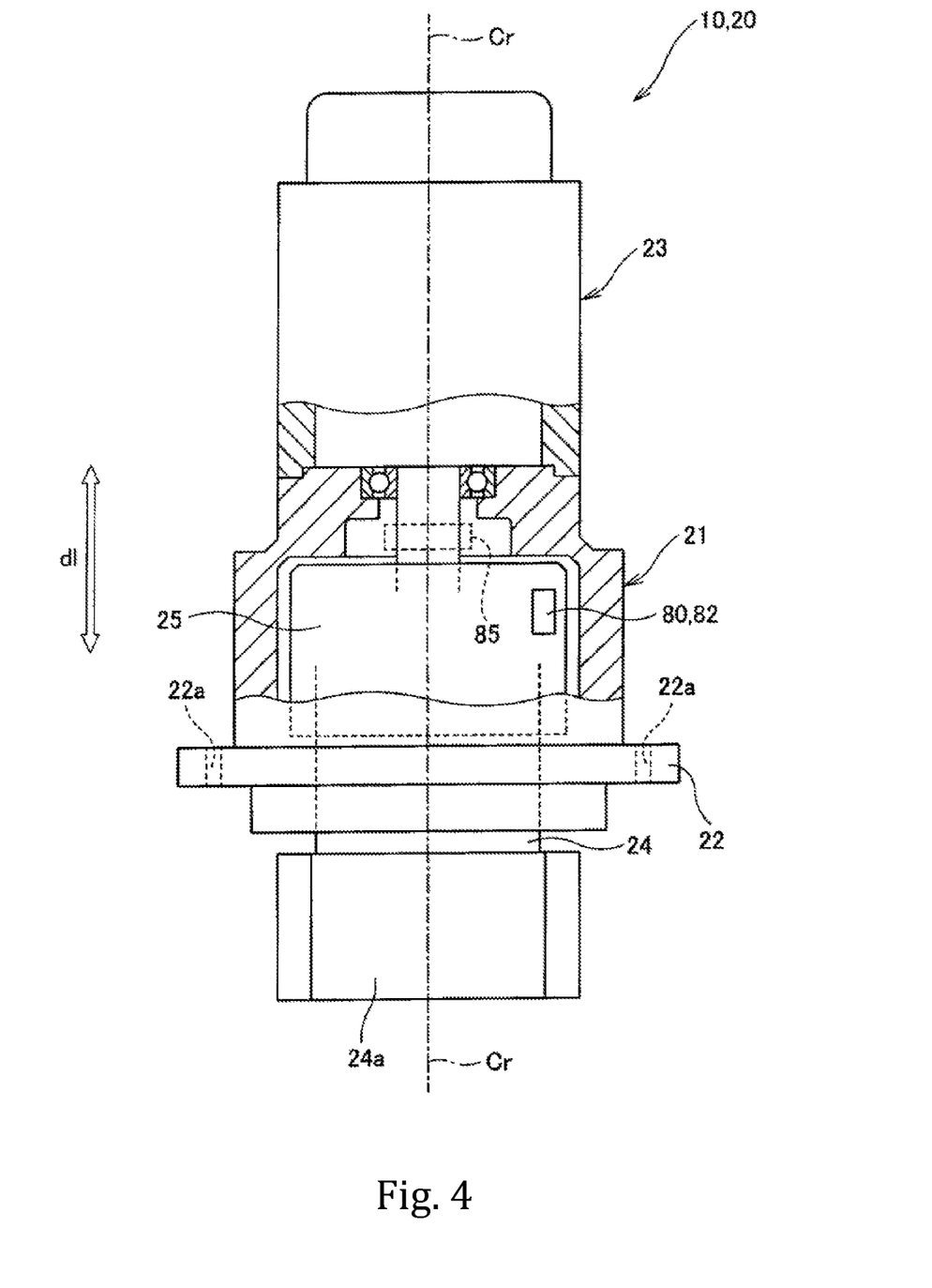
FIG. 4 is a view of a driving device shown in FIG. 2 as seen from a lateral side, and part of which is shown in section.
Figure 5:
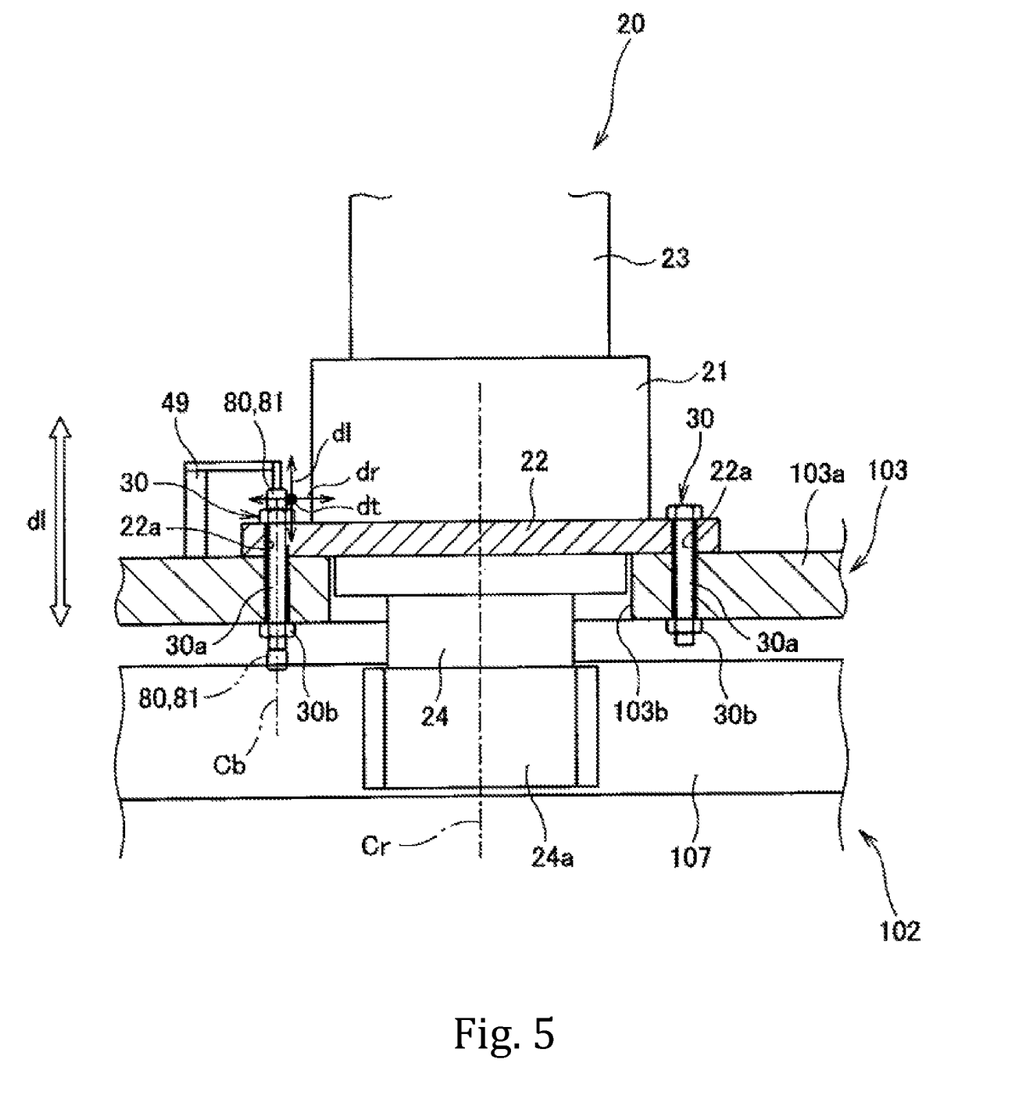
FIG. 5 is a view of an installation portion of the driving device, part of which is shown in section.
Figure 6:
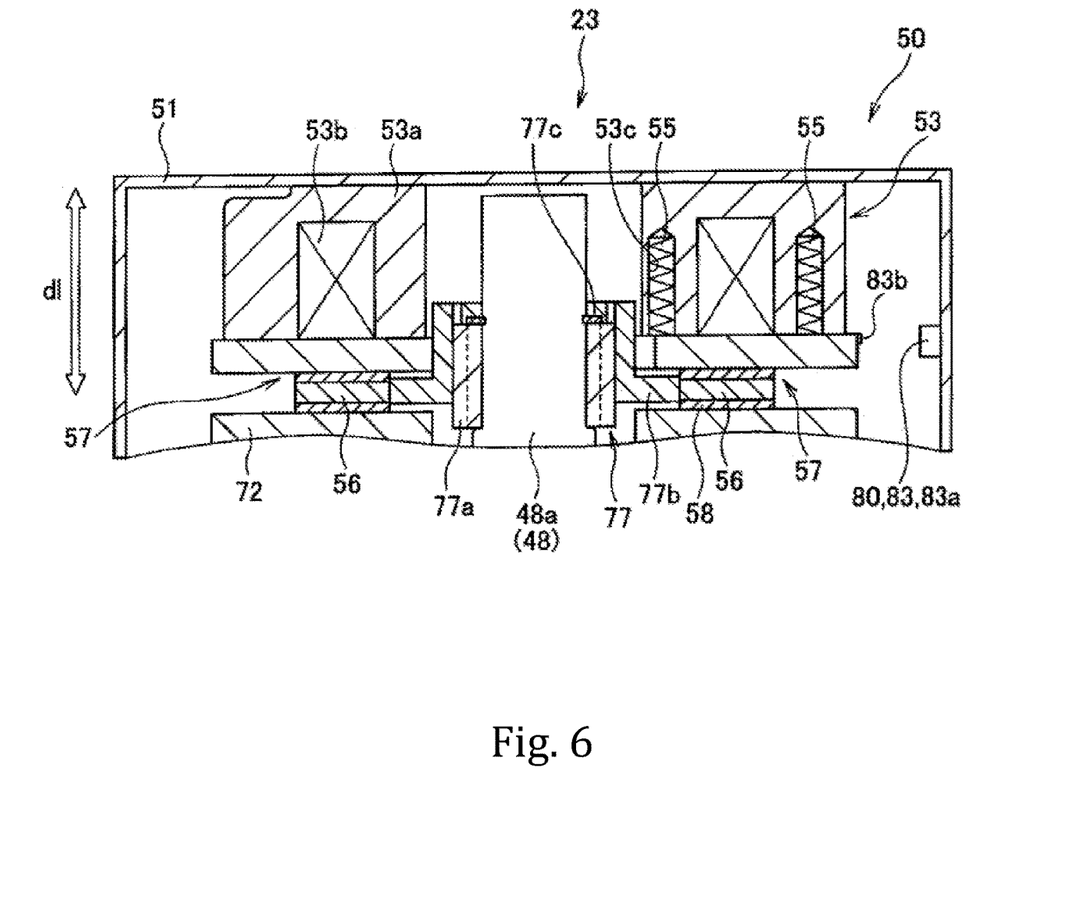
FIG. 6 schematically shows a brake mechanism of the driving device shown in FIG. 2.

FIG. 1 is a perspective view of a wind turbine 101. FIG. 2 is a sectional view showing part of a tower 102 and a nacelle 103. In FIG. 2, as for a driving device 10, an outer appearance thereof is shown instead of a cross-section thereof. FIG. 3 is a plan view showing an arrangement of the driving devices 10 in a movable section shown in FIG. 2. FIG. 4 is a view of the driving device 10 as seen from a lateral side, part of which is shown in section. FIG. 5 is a view showing an installation portion of the driving device 10, part of which is shown in section. FIG. 6 is a view showing a brake mechanism of the driving device 10, part of which is shown in section.

The driving device 10 is capable of driving the nacelle 103 installed so as to be rotatable with respect to the tower 102 of the wind turbine 101 or driving a blade 105 installed so as to be swingable in a pitch direction with respect to a rotor 104 mounted to the nacelle 103. That is, the driving device 10 can be used as a yaw driving device for carrying out yaw driving so as to cause the nacelle 103 to rotate with respect to the tower 102 and also as a pitch driving device for carrying out pitch driving so as to cause a shaft portion of the blade 105 to rotate with respect to the rotor 104. While the following describes, as an example, a case where the driving device 10 is used as a yaw driving device, the present invention is applicable also to a case where the driving device 10 is used as a pitch driving device.

As shown in FIG. 1, the wind turbine 101 includes the tower 102, the nacelle 103, the rotor 104, the blade 105, and so on. The tower 102 extends upward in a vertical direction from the ground. The nacelle 103 is installed so as to be rotatable with respect to a top portion of the tower 102. Rotation of the nacelle 103 with respect to the tower 102 is yaw rotation about a longitudinal direction of the tower 102 as a rotation center. In the illustrated example, the nacelle 103 is driven by a plurality of driving devices 10 to rotate with respect to the tower 102. Inside the nacelle 103, devices necessary for wind power generation are installed. For example, a power transmission shaft, an electric power generator connected to said power transmission shaft, and so on are disposed therein. The rotor 104 is connected to the power transmission shaft and is rotatable with respect to the nacelle 103. A plurality of (in an example shown in FIG. 1, three) blades 105 are provided and extend from the rotor 104 in a radial direction about a rotation axis of said rotor 104 with respect to the nacelle 103. The plurality of blades 105 are arranged at an equal angle from each other.

The blades 105 are each rotatable in the pitch direction. More specifically, the blades 105 are each rotatable about a longitudinal direction thereof with respect to the rotor 104. A connection point between the blades 105 and the rotor 104 is configured as the movable section so that the blades 105 and the rotor 104 are rotatable relative to each other. The blades 105 are driven to rotate by a driving device provided as a pitch driving device. The driving device as the pitch driving device may be configured similarly to an after-mentioned driving device 10 as a yaw driving device.

As shown in FIG. 2, the nacelle 103 is installed so as to be rotatable at a bottom portion 103a thereof with respect to the top portion of the tower 102 via a bearing 106. A ring gear 107 having internal teeth formed on an inner periphery thereof is fixed to the top portion of the tower 102. The ring gear 107 are not limited in terms of its teeth to the internal teeth provided on the inner periphery thereof and may have external teeth provided on an outer periphery thereof. In the drawings, the teeth of the ring gear 107 are not shown.

As shown in FIG. 2 and FIG. 3, with respect to the nacelle 103 (a first structure) and the tower 102 (a second structure) configured to rotate relative to each other, the plurality of driving devices 10 are provided in the nacelle 103. Each of the driving devices 10 includes a drive gear 24a meshing with the teeth of the ring gear 10 provided in the tower 102. As shown in FIG. 4, each of the driving devices 10 is provided with an electric motor 23 including a motor drive unit and a motor brake unit, which will be mentioned later, and a reducer 25 receiving power transmitted from said electric motor 23 (particularly, the motor drive unit). The motor drive unit outputs a driving force (rotational power), and the motor brake unit can reduce the driving force (rotational power) outputted from the motor drive unit by braking the motor drive unit. The term "braking" used herein is to be broadly construed, and a definition thereof embraces retaining a stopped state of an object that has been stopped and stopping a moving object.

By driving the driving devices 10 thus configured, it is possible to cause the nacelle 103 (the first structure) which is one structure at the movable section of the wind turbine 101 to rotate with respect to the tower 102 (the second structure) which is the other structure at the movable section of the wind turbine 101. Particularly, the plurality of driving devices 10 included in the wind turbine are operated in a synchronized manner and thus provides drive power of a magnitude sufficient to be able to cause the nacelle 103, which is a heavy object, to properly swivel with respect to the tower 102. The driving devices 10 operate based on a control signal sent from an after-mentioned controller 110 (a control unit, see FIG. 7) to the electric motor 23 (the motor drive unit and the motor brake unit). The plurality of driving devices 10 collectively constitute a driving device unit 9. Further, the driving device 10 and the controller 110 constitute the wind turbine drive system 5.

As shown in FIG. 3, the ring gear 107 is formed in a circumferential shape and has a center axis Cm. The nacelle 103 rotates about the center axis Cm of the ring gear 107. In an example shown, the center axis Cm of the ring gear 107 agrees with the longitudinal direction of the tower 102. In the following description, a direction parallel to the center axis Cm of the ring gear 107 is simply referred to also as an "axial direction dl."

In the wind turbine 101 shown, as shown in FIG. 3, there are provided a pair of driving device groups arranged in rotational symmetry about the center axis Cm of the ring gear 107. Each driving device group includes three driving devices 10. In the illustrated example, six driving devices 10 included in the pair of driving device groups constitute the driving device unit 9. Bodies 20 of the driving devices are arranged along a circumference cl1 (see FIG. 3) about the center axis Cm of the ring gear 107. The three driving devices 10 included in each driving device group are arranged at given intervals along the circumference cl1.

Next, a description is given of the driving device 10. Each driving device 10 includes the driving device body 20 having the drive gear 24a engaged with the ring gear 107, and an abnormality detection unit 80 that monitors the state of the driving device body 20 and detects its abnormality. In the illustrated example, the driving device body 20 is fixed to the nacelle 103. As shown in FIG. 5, each of the driving devices 10 is fixed to the nacelle 103 (the first structure) via a fastener 30 disposed so as to extend through a through hole 22a formed through a flange 22 of the driving device body 20.

As shown in FIG. 4, the driving device body 20 is provided with an output shaft 24 having the drive gear 24a that meshes with the ring gear 107, the case 21 rotatably retaining the output shaft 24, and the electric motor 23 fixed to the case 21. Furthermore, the driving device body 20 is provided further with the reducer 25 housed in the case 21 and connecting the electric motor 23 to the output shaft 24. The reducer 25 decelerates an input (rotational power) from the electric motor 23 while increasing a torque thereof and transmits the input to the output shaft 24. While there is no particular limitation on a specific configuration of the reducer 25 thus described, typically, the reducer 25 can adopt an eccentric oscillating gear-type speed reducing mechanism, a planetary gear-type speed reducing mechanism, or a speed reducing mechanism obtained by combining the eccentric oscillating gear-type speed reducing mechanism with the planetary gear-type speed reducing mechanism.

An end portion of the output shaft 24 distal from the reducer 25 extends out from the case 21, and the drive gear 24a is formed at this extending-out portion of the output shaft 24. As shown in FIG. 2 and FIG. 5, the output shaft 24 penetrates through a through hole 103b formed through the bottom portion 103a of the nacelle 103 and meshes with the ring gear 107. The drive gear 24a has a shape adapted to the ring gear 107. As one example, the drive gear 24a can be formed as a pinion gear having external teeth configured to mesh with the internal teeth of the ring gear 107. Each of the driving devices 10 has a longitudinal direction axis agreeing with a rotation axis Cr of the output shaft 24. In a state where each of the driving devices 10 is fixed to the nacelle 103, the rotation axis Cr of the output shaft 24 is parallel to an axial direction dl of the wind turbine 101.

The case 21 is formed in a cylindrical shape as shown in FIG. 4 and is disposed so that a longitudinal direction axis thereof is positioned on the rotation axis Cr as shown in FIG. 5. The case 21 is open at both ends thereof along the rotation axis Cr. The drive gear 24a of the output shaft 24 is exposed from an opening of the case 21 near the tower 102. The electric motor 23 is mounted to an opening of the case 21 on an opposite side to the tower 102. Furthermore, the case 21 includes the flange 22. As shown in FIG. 3, the flange 22 of this example is formed in an annular shape and extends along a circumference cl3 about the rotation axis Cr of the output shaft 24. As shown in FIG. 4 and FIG. 5, the through hole 22a is formed through the flange 22 so as to extend in the axial direction dl. A plurality of the through holes 22a are formed on the circumference cl3 about the rotation axis Cr of the output shaft 24. In the illustrated example, twelve through holes 22a are formed.

The fastener 30 penetrates through the flange 20 by extending through each of the through holes 22a formed through the flange 22 of the driving device body 20. In the example shown in FIG. 5, the fastener 30 includes a bolt 30a and a nut 30b. The bolt 30a penetrates through the flange 22 of the driving device body 20 and the bottom portion 103a of the nacelle 103. The nut 30b is screwed with the bolt 30a in a direction from the tower 102. The fastener 30 formed of a combination of the bolt 30a and the nut 30b is provided with respect to each of the through holes 22a of the driving device body 20. In the example shown, the driving device bodies 20 are mounted to the nacelle 103 at twelve locations thereon by use of twelve fasteners 30.

The fastener 30 is not limited to the illustrated example. The fastener 30 may be configured such that, instead of using the nut 30b, a female screw with which a male screw of the bolt 30a can be screwed is formed along a through hole of the nacelle 103. In this case, the fastener 30 is formed of the bolt 30a, and the male screw of the bolt 30a meshes with the female screw in the through hole of the nacelle 103, thus making it possible to fix the driving device body 20 to the nacelle 103.

Next, a description is given of the electric motor 23. In the illustrated example, the electric motor 23 includes a motor drive unit 48 and a motor brake unit 50. FIG. 6 is the view schematically showing a partial cross-section of the electric motor 23. The motor brake unit 50 is a brake mechanism that brakes a rotational motion conveyed to the drive gear 24a. However, as will be described later, instead of or in addition to the motor brake unit 50, the driving device body 20 may include various forms of brake mechanism that puts a brake on the rotational motion conveyed to the drive gear 24a or the rotation output from the drive gear 24a.

The electric motor 23 provided with a motor drive unit 48 and a motor brake unit 50 is provided in each of the driving devices 10, and one motor brake unit 50 is mounted to each motor drive unit 48. The motor drive unit 48 can be formed of any device capable of controlling, based on a command from the controller 110 (see FIG. 7), the number of rotations of a drive shaft 48a. The illustrated motor brake unit 50 includes a mechanism as an electromagnetic brake for, based on a command from the controller 110 (see FIG. 7), braking rotation of the drive shaft 48a of the motor drive unit 48 or releasing the drive shaft 48a from being braked. In a state where rotation of the drive shaft 48a is braked, the number of rotations of the drive shaft 48a is reduced, and thus eventually, the drive shaft 48a can be completely stopped from rotating. On the other hand, in a state where the drive shaft 48a is released from being braked, without being braked by the motor brake unit 50, the drive shaft 48a can rotate basically at an original number of rotations corresponding to electric power supplied to the motor drive unit 48. The driving force (rotational power) output from the drive shaft 48*a* of the motor drive unit 48 is transmitted to the output shaft 24 via the reducer 25.

The motor brake unit 50 of this example is mounted to an end portion of a cover 72 of the motor drive unit 48 on an opposite side to the reducer 25 and includes a housing 51, a friction plate 56, an armature 57, an elastic member 55, an electromagnet 53, a first friction plate connecting portion 77, and so on. The housing 51 is a structure housing the friction plate 56, the armature 57, the elastic member 55, the electromagnet 53, the first friction plate connecting portion 77, and so on and is fixed to the cover 72 of the motor drive unit 48. The friction plate 56 is connected to the drive shaft 48*a* of the motor drive unit 48 via the first friction plate connecting portion 77. In a through hole of the friction plate 56, the drive shaft 48*a* is disposed in a state where one end portion thereof penetrates through the through hole.

The first friction plate connecting portion 77 of this example includes a spline shaft 77*a* and a slide shaft 77*b*. The spline shaft 77*a* is fixed to an outer periphery of the one end portion of the drive shaft 48*a* through key coupling via a key member (not shown) and engagement with a stopper ring 77*c*. The slide shaft 77*b* is mounted to the spline shaft 77*a* so as to be slidable in an axial direction. Furthermore, in the first friction plate connecting portion 77, there is provided a spring mechanism (not shown) for situating the slide shaft 77*b* at a predetermined position in the axial direction with respect to the spline shaft 77*a*. An inner periphery of the friction plate 56 is fixed to an edge portion of an outer periphery of a flange-shaped portion of the slide shaft 77*b*, so that the friction plate 56 is coupled integrally with the slide shaft 77*b*.

In the motor brake unit 50 having the above-described configuration, when the drive shaft 48*a* rotates, the spline shaft 77*a*, the slide shaft 77*b*, and the friction plate 56 also rotate together with the drive shaft 48*a*. In a state where the after-mentioned electromagnet 53 is excited, the slide shaft 77*b* and the friction plate 56 that are retained so as to be slidable in the axial direction with respect to the drive shaft 48*a* and the spline shaft 77*a* are situated at a predetermined position in the axial direction of the spline shaft 77*a* by the spring mechanism. When disposed at this predetermined position, the friction plate 56 is separated from the armature 57 and a friction plate 58, which will be mentioned later.

The armature 57 is provided so as to be contactable with the friction plate 56. The armature 57 is provided as a member for generating a braking force for braking rotation of the drive shaft 48*a* by contacting with the friction plate 56. Furthermore, in this example, the friction plate 58 is provided at a location on one end portion of the cover 72 of the motor drive unit 48, where the friction plate 58 is opposed to the friction plate 56. The friction plate 58 is installed at such a position as to be contactable with the friction plate 56.

The elastic member 55 is retained in an electromagnetic body 53*a* of the electromagnet 53, which will be mentioned later, and biases the armature 57 in a direction from the electromagnet 53 toward the friction plate 56. Particularly, as a plurality of elastic members 55 of this example, in the electromagnetic body 53*a*, two inner peripheral and outer peripheral elastic members 55 are arranged in a circumferential direction concentrically about the drive shaft 48*a*. The above-mentioned form of arranging the elastic members 55 is merely an example, and the elastic members 55 may be arranged in any other form.

The electromagnet 53 includes the electromagnetic body 53*a* and a coil portion 53*b* and attracts the armature 57 by a magnetic force so as to separate the armature 57 from the friction plate 56. To the housing 51, the electromagnetic body 53*a* is fixed at an end portion thereof on an opposite side to where the electromagnetic body 53*a* is opposed to the armature 57. The electromagnetic body 53*a* has a plurality of elastic member retaining holes 53*c* open toward the armature 57, and the elastic members 55 are disposed in the elastic member retaining holes 53*c*, respectively. The coil portion 53*b* is installed inside the electromagnetic body 53*a* and disposed along the circumferential direction of the electromagnetic body 53*a*. Supplying and shutting off of an electric current to the coil portion 53*b* is performed based on a command of the controller 110.

For example, when the motor brake unit 50 releases the drive shaft 48*a* from being braked, based on a command of the controller 110, an electric current is supplied to the coil portion 53*b* to energize the electromagnet 53. When the electromagnet 53 is energized and thus is brought into an exited state, the armature 57 is attracted to the coil portion 53*b* by a magnetic force generated at the electromagnet 53. At this time, the armature 57 is attracted to the electromagnet 53 against an elastic force (a spring force) of the plurality of elastic members 55. With this configuration, the armature 57 is separated from the friction plate 56, and thus the drive shaft 48*a* is released from being braked. Accordingly, in a state where the electromagnet 53 is excited and thus the drive shaft 48*a* is released from being braked, the armature 57 is brought into a state of contacting with the electromagnetic body 53*a*.

On the other hand, when the motor brake unit 50 brakes the drive shaft 48*a*, based on a command of the controller 110, a supply of an electric current to the coil portion 53*b* is shut off to demagnetize the electromagnet 53. When the electromagnet 53 is brought into a demagnetized state, the armature 57 is biased toward the friction plate 56 by an elastic force of the plurality of elastic members 55, and thus the armature 57 contacts with the friction plate 56. With this configuration, a friction force is generated between the armature 57 and the friction plate 56, and thus rotation of the drive shaft 48*a* is braked FIG. 6 shows a state where the electromagnet 53 is demagnetized, which is a state where rotation of the drive shaft 48*a* is braked.

Furthermore, in a state where the electromagnet 53 is demagnetized and thus the drive shaft 48*a* is braked, the friction plate 56 is in contact also with the friction plate 58 under a biasing force acting from the armature 57. Accordingly, when the electromagnet 53 is demagnetized, the friction plate 56 is brought into a state of being sandwiched between the armature 57 and the friction plate 58 under a biasing force from the plurality of elastic members 55. With this configuration, by a friction force generated between the armature 57 and the friction plate 56 and a friction force generated between the friction plate 56 and the friction plate 58, rotation of the drive shaft 48*a* is braked.

Next, a description is given of the abnormality detection unit 80 that monitors the state of the above-described driving device body 20 to detect an abnormality thereof. In the illustrated example, the abnormality detection unit 80 monitors a force generated between the ring gear 107 and the drive gear 24*a*, the state of the driving device body 20, and the operation of the brake mechanism (motor brake unit 50). More specifically, the abnormality detection unit 80 includes a load sensor 81, an oil sensor 82, and a brake mechanism sensor 83. Each of the sensors 81, 82, 83 will be described below.

The load sensor 81 detects a force generated at the meshing portion between the ring gear 107 and the drive gear 24*a*. The load sensor 81 may include various sensors capable of acquiring indices and characteristics related to the force generated at the meshing portion. Thus, the load sensor 81 directly or indirectly detects the force generated at the meshing portion.

In the example shown in FIG. 5, the load sensor 81 is configured as a sensor that measures a change in the state of the fastener 30. The fastener 30 is a member for fixing the driving device body 20 to the nacelle 103. Therefore, the change in state of the fastener 30 is associated with generation of a force (load) on the meshing portion between the ring gear 107 and the drive gear 24*a*. Therefore, by detecting the amount of change in the state of fastener 30, it is possible to detect the magnitude of the stress (load) between the drive gear 24*a* and the ring gear 107.

Specifically, the load sensor 81 may be formed of a known sensor for measuring one or more selected from the group consisting of a load applied to the fastener 30, a displacement of the fastener 30 with respect to the nacelle 103, and a relative position of the fastener 30 to the nacelle 103. In the example shown, an axial force sensor is used as the load sensor 81, and thus it is possible to measure a load (an axial force) applied to the fastener 30 in a particular direction. As shown in FIG. 5, the load sensor 81 is fixedly retained by use of a jig 49 with respect to the nacelle 103, which is one structure at the movable section. The axial force sensor constituting the sensor 40 contacts with a head portion of the bolt 30*a* as a component of the fastener 30.

There is, however, no limitation to this example. As shown by a chain double-dashed line in FIG. 5, the load sensor 81 may contact with a distal end portion of the bolt 30*a* on an opposite side to the head portion or may contact with the nut 30*b*. Furthermore, the sensor 40 may detect a load applied to a fastening bolt fastening the nacelle 103 to the case 21. As another example, when a strain gauge is used as the load sensor 81, it becomes possible to measure the stress applied to the fastener. As yet another example, when a magnetic sensor or a photoelectric sensor is used as the sensor 81, it becomes possible to measure a position and a displacement of the fastener 30 in a non-contact manner.

In the sensor that monitors the control current of the motor described in the prior art, excessive force may be generated at the meshing portion between the ring gear 107 and the drive gear 24*a* when the wind turbine catches a gust of wind that tries to rotate the nacelle 103 relative to the tower 102. The sensor monitoring the control current of the motor is not able to detect a load generated in the meshing portion when the driving device 10 is not operated. Moreover, even when the driving device 10 is operating, it is not possible to directly estimate the magnitude of the force generated in the meshing portion by using the control current of the motor since the internal efficiency of the driving device affects. Further, as shown in the illustrated example, in the movable section in which the driving devices 10 are used, when a target driving device 10 is stopped and a driving force is output from the driving device body 20 of another driving device 10, an excessive force may be generated between the drive gear 24*a* of the target driving device 10 and the ring gear 107. However, when the target driving device 10 is stopped in such a situation, it is not possible to detect abnormality even if the control current of the driving device 10 is monitored.

As described above, in the prior art which cannot detect these situations, it was not possible to avoid damage of the driving device body 20 and the ring gear 107 caused by the excessive load generated in the meshing portion. In particular, if the ring gear 107 and its surrounding structures are broken, a long repair period is required so that it has a high impact on the operation of the wind turbine. The load sensor 81 detects a force generated at the meshing portion between the ring gear 107 and the drive gear 24*a*. Therefore, by using the detection result of the load sensor 81, it is possible to effectively avoid breakage of the driving device body 20 and breakage of the ring gear 107 and its surrounding structure which may significantly affects the operation of the wind turbine.

Next, a description is given of the oil sensor 82. As described above, the driving device body 20 includes the reducer 25 configured as an eccentric oscillating type reducer or a planetary gear type reducer, and other mechanism. Therefore, oil serving as lubricant typically fills the case 21 that accommodates the mechanism including the reducer 25 and the like. The condition of the oil inside the driving device body 20 accurately reflects the state of the internal mechanism of the drive body 20. As shown in FIG. 4, at least a sensing portion of the oil sensor 82 is disposed in the oil. The oil sensor 82 monitors the condition of the oil used in the driving device body 20, for example, the color and water content of the oil. From the color and water content of oil, it is possible to determine inclusion of foreign matter (for example, wear powder) in the oil, the degree of oxidation of the oil, etc., and further investigate the possibility of future damage. That is, by using the oil sensor 82, it is possible to detect aging deterioration of the driving device body 20.

The above-described prior art in which the control current of the motor is monitored can only detect an abnormal condition that has already occurred. Therefore, it has not been possible to predict in advance the cause of a failure that may require a long-term repair. Moreover, the time from when a high load is generated to when a damage occurs in the driving device may be extremely short, such as several milliseconds. Such damage could not be avoided with the prior art of monitoring the control current alone. Whereas the oil sensor 82 can diagnose aging deterioration of the driving device body 20. Therefore, by using the detection result of the oil sensor 82, it is possible to effectively avoid breakage of the driving device body 20 and breakage of the ring gear 107 and its surrounding structure which may significantly affects the operation of the wind turbine.

The state monitoring sensor that monitors the state of the driving device body 20 is not limited to the oil sensor 82. For example, instead of or in addition to the oil sensor 82, the state monitoring sensor may include a camera that captures components included in the driving device body 20, or a displacement sensor that monitors a displacement of the component(s) included in the driving device body 20, or a sensor that monitors a load occurred on the component(s) included in the driving device body 20.

The brake mechanism sensor 83 monitors the operation of the brake mechanism. The brake mechanism is the mechanism that brakes the rotation transmitted to the drive gear 24*a* or the rotation output from the drive gear 24*a*. In the example shown in FIG. 6, the brake mechanism includes the motor brake unit 50. The motor brake unit 50 is incorporated in the motor 23 and has an armature 57 that operates based on a control signal from the controller 110. In the example shown in FIG. 6, the brake mechanism sensor 83 monitors the position of the armature 57 along the axial direction dl.

More specifically, the brake mechanism sensor 83 shown in FIG. 6 includes a detection target portion 83*b* attached to the armature 57, and a detection unit 83*a* that detects the position and displacement of the detection target portion 83*b* in a direction parallel to the axial direction dl. The detection target portion 83*b* in this example is permanent magnet fixed to the armature 57 and may be attached to a part of the outer peripheral portion of the armature 57 close to the electromagnet 53. The detection unit 83a is provided as a sensor capable of detecting the position and displacement of the detection target portion 83b that moves together with the armature 57. That is, the detection unit 83a detects the position and displacement of the detection target portion 83b in the direction parallel to the rotation axis Cr of the drive shaft 48a, to detect the position and displacement of the armature 57 in the direction parallel to the rotation axis Cr of the drive shaft 48a. The illustrated detection unit 83a is provided as a sensor that measures an intensity and a direction of a magnetic field generated by the detection target portion 83 which is permanent magnet, and fixed to an inner wall of the housing 51. The detection unit 83a detects the position and displacement of the detection target portion 83b by measuring the intensity and direction of the magnetic field generated by the detection target portion 83b. Thus, the detection unit 83a is preferably fixed to the housing 51 at a position corresponding to the detection target portion 83b in the direction parallel to the rotation axis Cr of the drive shaft 48a.

By using the brake mechanism sensor 83, it is possible to detect an abnormal state in which a malfunction of the motor brake unit 50 that serves as the brake mechanism occurs due to adhesion of the armature 57 or the like. For example, if a strong wind blows in a state where some trouble occurs in the brake mechanism and the operation of the drive gear 24a is restrained, an excessive force may be generated at the meshing portion between the drive gear 24a and the ring gear 107. Such a situation cannot be detected by the prior art that monitors the control current. Further, as shown in the illustrated example, in the movable section in which the driving devices 10 are used, when a trouble occurs in the brake mechanism of the target driving device 10 so that the drive gear 24a is restrained and a driving force is output from the driving device body 20 of another driving device 10, an excessive force may be generated between the drive gear 24a of the target driving device 10 and the ring gear 107. However, when the target driving device 10 is stopped in such a situation, it is not possible to detect abnormality even if the control current of the driving device 10 is monitored. In this respect, the brake mechanism sensor 83 monitors the operation of the motor brake unit 50 constituting the brake mechanism. Therefore, by using the detection result of the brake mechanism sensor 83, it is possible to effectively avoid breakage of the driving device body 20 and breakage of the ring gear 107 and its surrounding structure which may significantly affects the operation of the wind turbine.

Furthermore, for example, when the electric motor 23 of any of the driving devices 10 outputs a driving force in a state where the operation of the drive gear 24a is unintentionally restrained due to an abnormality occurred in the brake mechanism, the driving force acts as an external force on the meshing portion between the drive gear 24a and the ring gear 107. Within a very short time, such as only several milliseconds after the output of the driving force acting as the external force, breakage of the driving device body 20 and the ring gear 107 may happen. Such breakage cannot be effectively avoided by monitoring the control current. Whereas the brake mechanism sensor 83 is able to detect an abnormality of the motor brake unit 50 constituting the brake mechanism. Therefore, it is possible to predict the occurrence of an excessive load on the meshing portion from the detection result of the brake mechanism sensor 83 and to effectively avoid the breakage.

The abnormality detection unit 80 including the load sensor 81, the oil sensor 82 and the brake mechanism sensor 83 is separately provided for each driving device body 20. That is, each driving device 10 includes a separate abnormality detection unit 80, and an abnormality is detected for the corresponding driving device 10.

Figure 7:
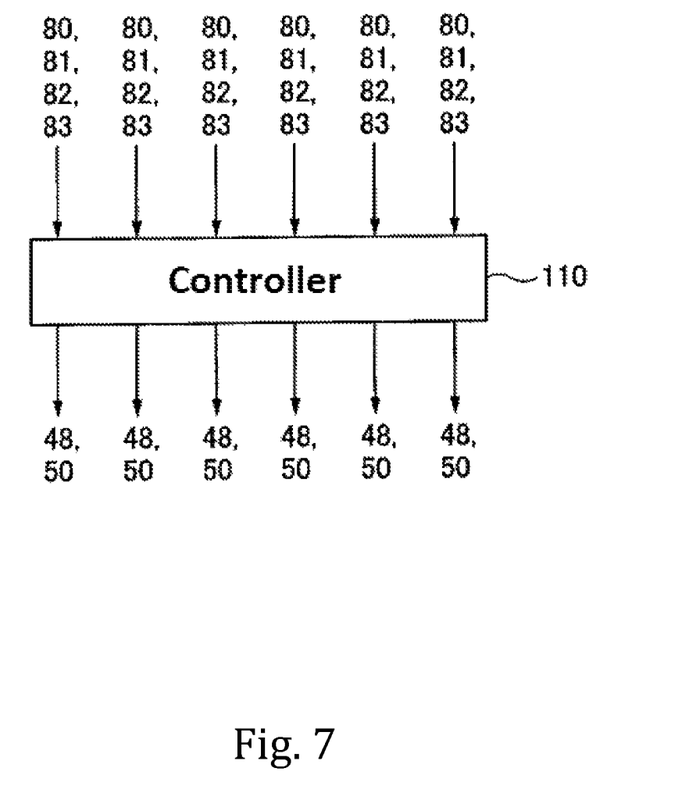
FIG. 7 is a block diagram for explaining a functional configuration of a controller.

FIG. 7 is a block diagram for describing the functions of the controller 110. As shown in FIG. 7, the controller 110 receives detection results from the abnormality detection units 80 provided in the plurality of driving devices 10 (in this example, six driving devices 10) respectively. That is, the load sensor 81, the oil sensor 82, and the brake mechanism sensor 83 that constitute the abnormality detection unit 80 for the corresponding driving device 10 are connected to the control device 110. The control device 110 may output a control signal for controlling the motor drive unit 48 and the motor brake unit 50 provided in each driving device 10. There is no particular limitation on an installation position of the controller 110. The controller 110 may be provided integrally with any of the elements constituting the wind turbine 101 (for example, the tower 102, the nacelle 103, the rotor 104, or the blade 105) or independently of these elements.

When the abnormality detection unit 80 for any of the driving devices 10 detected an abnormality, the control device 110 stops the output of the driving force from the drive gear 24a in the driving device body 20 of that driving device 10 to the ring gear 107. The driving force from the drive gear 24a can be stopped typically by interrupting the power supply to the motor 23 using the controller 110. By stopping the output from the drive gear 24a to the ring gear 107 in a state where the excessive force is applied to the meshing portion between the drive gear 24a and the ring gear 107, it is possible to avoid a further increase in load on the meshing portion. Moreover, when damage caused by aging deterioration of the driving device body 20 is predicted from the condition of oil, the output of the driving force from the driving device body 20 may be stopped to effectively avoid the breakage of the ring gear 107 connected to the driving device body 20 and the surrounding structure thereof. Further, when a failure of the motor brake unit 50 is found, it is possible to effectively avoid further damage to the driving device body 20 and further damage to the ring gear 107 connected to the driving device body 20 and the surrounding structure thereof.

When the abnormality detection unit 80 for any of the driving devices 10 detected an abnormality, the control device 110 removes a brake on the rotation by the brake mechanism (motor brake unit 50) of the corresponding driving device 10. That is, when the abnormality detection unit 80 detected an abnormality, the control device 110 sends a control signal to release the brake on the rotation by the brake mechanism (motor brake unit 50). In the illustrated example, the release of the rotational brake performed by the motor brake unit 50 can be realized by supplying power to the motor brake unit 50 using the controller 110. For example, if the rotation of the drive gear 24a is restricted by the braking force of the brake mechanism when an external force such as gust works, an excessive load may be imposed at the meshing portion between the drive gear 24a and the ring gear 107. To avoid this, the control device 110 removes a brake on the rotation by the brake mechanism (motor brake unit 50) of the corresponding driving device 10 when the abnormality detection unit 80 for the driving device 10 detected an abnormality.

Furthermore, in addition to stopping the output of the driving force from the drive gear 24a to the ring gear 107 in one driving device 10 when the abnormality detection unit 80 for the driving device 10 detected an abnormality, the control device 110 also stop the output of the driving force from the drive gear 24a to the ring gear 107 in the driving devices other than the driving device for which the abnormality has been detected. Furthermore, when the abnormality detection unit 80 for one driving device 10 detected an abnormality, in addition to releasing the brake on the rotation by the motor brake unit 50 in the corresponding driving device 10, the control device 110 releases brakes of the brake mechanisms in the driving devices other than the driving device 10 for which the abnormality has been detected. As described above, when more than one driving device 10 is provided in a single movable section, the drive force output from the drive gear 24a of one driving device 10 to the ring gear 107 acts as an external force on the meshing portion between the drive gear(s) 24a of other driving device(s) 10 and the ring gear 107. Therefore, when an abnormality is found in any of the driving devices, it is avoided that the driving force of the driving device 10 is applied as an external force to the meshing portion(s) between other driving device(s) 10 and the ring gear 107, and further the brake force(s) of the brake mechanism(s) are removed from the driving devices 10 so that each driving device 10 is allowed to move flexibly to accommodate to the external force. In this way, it is possible to more effectively avoid damage to the driving device body 20 and damage to the ring gear 107 connected to the driving device body 20 and the surrounding structure thereof.

In the movable section between the nacelle 103 and the tower 102, stopping the output of the driving force from the drive gear 24a in the driving device 10 to the ring gear 107 and releasing the brake on the rotation by the brake mechanism 50 in the driving device 10 is called a free yaw control. In the free yaw control, free relative rotation between the nacelle 103 (the first structure) and the tower 102 (the second structure) is permitted, and a braking force and a drive force that might inhibit the free relative rotation between the nacelle 103 and the tower 102 are reduced or canceled. In a case where the motor drive unit 48 and the motor brake unit 50 as mentioned above are provided, the controller 110 shuts off energization with respect to the motor drive unit 48 so as to stop the drive shaft 48a from rotating and also controls energization with respect to the motor brake unit 50 so that a braking force is not applied from the motor brake unit 50 to the motor drive unit 48 (namely, the drive shaft 48a).

Furthermore, in a case where any other drive unit and any other braking unit are provided, the controller 110 controls the any other drive means and the any other brake means to eliminate a braking force and a drive force that might inhibit free relative rotation between the nacelle 103 and the tower 102. For example, in a case where there is provided a braking device (not shown), such as a caliper brake, for directly braking a rotational operation of the ring gear 107, the controller 110 controls said braking device so that a braking force is not applied from said braking device to the ring gear 107.

With the controller 110 performing the above-mentioned free yaw control, the drive gear 24a of each driving device 10 and the ring gear 107 are placed in a freely rotatable state, and thus the nacelle 103 can freely rotate with respect to the tower 102. Such free rotation can effectively prevent a load between each drive gear 24a and the ring gear 107 from becoming excessive, and thus trouble such as a breakage of the various elements constituting each of the driving devices 10 or the ring gear 107 can be avoided before it happens.

In the embodiment described above, the driving device 10 includes the driving device body 20 that is provided in one structure at the movable section of the wind turbine 101 and has the drive gear 24a meshing with the ring gear 107 provided in the other structure at the movable section, and the abnormality detection unit 80 that monitors the force generated between the ring gear 107 and the drive gear 24a or the condition of the oil in the driving device body 20 or monitors both. When the abnormality detection unit 80 detected an abnormality, the output from the drive gear 24a in the driving device body 20 to the ring gear 107 is stopped. In the driving device 10, the abnormality detection unit 80 is able to monitor not only an abnormality that the magnitude of the output from the driving device body 20 becomes excessive, for example, the control current of the driving device body 20 becomes excessive, but also able to detect the state where a large external force is applied and monitor the progress of aging. Moreover, the output of the driving force from the driving device body 20 is stopped (restricted) when an abnormality is found, so breakage of the driving device 10 and damage to the ring gear 107 and its surrounding structure can be effectively avoided regardless of whether the control current of the driving device 10 becomes excessive or not. Further, if the output of the driving force from the driving device body 20 is started while there is an abnormality, the driving device 10 and the ring gear 107 may be instantaneously damaged. In this respect, the driving device 10 described above is able to detect occurrence of an excessive external force even when the drive force output from the driving device body 20 is stopped, and further, to predict (detect) an abnormality of the device body 20 caused by aging based on the condition of the oil. Thus, the abnormality detection unit 80 detects an abnormality in the state where the output of the driving force from the driving device body 20 is stopped, and it is possible to effectively copes with instantaneous damage of the driving device 10, the ring gear 107, and the like.

Further, in the embodiment described above, the driving device body 20 includes the brake mechanism (motor brake unit 50) for braking the rotation transmitted to the drive gear drive gear or the rotation output from the drive gear 24a. The abnormality detection unit 80 monitors the operation of the brake mechanism 50. That is, the abnormality detection unit detects a state in which the operation of the drive gear 24a and the ring gear 107 at the meshing portion is unintentionally restricted due to an abnormal operation of the brake mechanism 50, and it is avoided that the driving force is output from the drive gear 24a to the ring gear 107 while the abnormality is being detected. Therefore, it can be effectively prevented in advance that an excessive external force is applied on the meshing portion and that the control current of the driving device 10 becomes excessive. Consequently, it is possible to effectively avoid damage to the driving device, ring gear and the like.

Further, in the embodiment described above, the driving device body 20 includes the brake mechanism (motor brake unit 50) for braking the rotation transmitted to the drive gear 24a or the rotation output from the drive gear 24a. When the abnormality detection unit 80 detected an abnormality, a brake on the rotation performed by the brake mechanism (motor brake unit 50) is removed. In the driving device 10 configured as described above, it is possible avoid that an excessive external force is applied to the meshing portion while the operation of the drive gear 24a and the ring gear 107 at the meshing portion is restricted by the brake mechanism 50 without the control current becoming excessive.

Consequently, it is possible to effectively avoid damage to the driving device, ring gear and the like.

In the embodiment described above, the driving device 10 includes the drive gear 24*a* that is provided in one structure at the movable section of the wind turbine 101 and meshes with the ring gear 107 provided in the other structure at the movable section, the driving device body 20 that has the brake mechanism (motor brake unit 50) for braking rotation transmitted to the drive gear 24*a* or rotation output from the drive gear 24*a*, and the abnormality detection unit 80 that monitors the operation of the brake mechanism 50. When the abnormality detection unit 80 detected an abnormality, the output from the drive gear 24*a* in the driving device body 20 to the ring gear 107 is stopped. In the driving device 10, the abnormality detection unit 80 can detect a state in which a brake is applied on the rotation of the drive gear 24*a* by the brake mechanism 50 due to an abnormality occurred in the brake mechanism. That is, the abnormality detection unit 80 can detect a state in which the operation at the meshing portion between the drive gear 24*a* and the ring gear 107 is restricted. Moreover, the output of the driving force from the driving device body 20 is stopped (restricted) when the abnormality is detected, so breakage of the driving device 10 and damage to the ring gear 107 and its surrounding structure can be effectively avoided regardless of whether the control current of the driving device 10 becomes excessive or not. Further, if the output of the driving force from the driving device body 20 is started while the operation of the meshing portion is restricted, the driving device 10 and the ring gear 107 may be instantaneously damaged. The driving device 10 described above is able to detect the restricted state of the meshing portion between the drive gear 24*a* and the ring gear 107 caused by the abnormality of the brake mechanism 50 while the output of the driving force from the driving device body 20 is stopped. Since the abnormality detection unit 80 detects an abnormality in the state where the output of the driving force from the driving device body 20 is stopped, it is possible to effectively copes with instantaneous damage of the driving device 10, the ring gear 107, and the like.

Moreover, in the above embodiment, when the abnormality detection unit 80 detected an abnormality, a brake on the rotation performed by the brake mechanism (motor brake unit 50) is removed. In the above driving device 10, the abnormality detection unit 80 can detect a state in which movement of the meshing portion is unintentionally restricted due to the abnormality of the brake mechanism 50, and this unintended restriction can be eliminated. Accordingly, it is possible to effectively avoid that an excessive external force is applied to the meshing portion between the drive gear 24*a* and the ring gear 107 while the movement thereof is unintentionally restricted and consequently the driving device 10, the ring gear 107 and the like are damaged without the excessive control current.

Furthermore, in the embodiment described above, the wind turbine 101 and the driving device unit 9 include the plurality of driving devices 10 provided in the single movable section. The abnormality detection unit 80 is separately provided for each driving device 10. In the wind turbine 101 and the driving device unit 9, a driving force output from the drive gear 24*a* of one driving device 10 to the ring gear 107 acts as an external force to the meshing portion between the ring gear 107 and the drive gear 24*a* of other driving device 10 whose movement is restricted by the brake mechanism 50. Further, a braking force that constrains the movement of the drive gear 24*a* and the ring gear 107 by the brake mechanism 50 of one driving device 10 serves as an external force applied to the meshing portion between the ring gear 107 and the drive gear 24*a* of other driving device 10 outputting the driving force. When one abnormality detection unit 80 detected an abnormality in the wind turbine 101 and the driving device unit 9 described above, in addition to stopping the output of the driving force to the ring gear 107 from the drive gear 24*a* of the driving device 10 in which this abnormality detection unit 80 is provided, it is configured to stop the output of the driving force to the ring gear 107 from the drive gear(s) 24*a* in the driving device(s) 10 other than the driving device 10 in which the abnormality detection unit 80 is provided. Thus the advantageous effects described above will be notably exerted and it is possible to effectively avoid damage to the driving devices 10, the ring gear 107 and the like.

Furthermore, in the embodiment described above, the wind turbine 101 and the driving device unit 9 include the plurality of driving devices 10 provided in the single movable section. The abnormality detection unit 80 is separately provided for each driving device 10. In the wind turbine 101 and the driving device unit 9, a driving force output from the drive gear 24*a* of one driving device 10 to the ring gear 107 acts as an external force to the meshing portion between the ring gear 107 and the drive gear 24*a* of other driving device 10 whose movement is restricted by the brake mechanism 50. Further, the force that constrains the movement of the drive gear 24*a* and the ring gear 107 by the brake mechanism 50 of one driving device 10 serves as an external force applied to the meshing portion between the ring gear 107 and the drive gear 24*a* of other driving device 10 outputting the driving force. In the wind turbine 101 and the driving device unit 9 described herein, when one abnormality detection unit 80 detected an abnormality, a brake by the brake mechanism 50 on the rotation is released in the driving device 10 provided with the abnormality detection unit 80, and a brake by the brake mechanism(s) 50 is released also in the driving device(s) 10 other than the driving device 10 in which the abnormality detection unit 80 detected the abnormality is provided. Thus the advantageous effects described above will be notably exerted and it is possible to effectively avoid damage to the driving devices 10, the ring gear 107 and the like.

Various modifications can be made to the foregoing embodiment. The following describes one modification example. In the following description, elements that can be configured in a similar manner to those in the foregoing embodiment are denoted by the same reference characters as those used for corresponding elements in the foregoing embodiment, and duplicate descriptions thereof are omitted.

For example, in the embodiment described above, the abnormality detection unit 80 includes the load sensor 81, the oil sensor 82, and the brake mechanism sensor 83. However, the invention is not limited to the above-described example, and the abnormality detection unit 80 may include one or more selected from the group consisting of the load sensor 81, the oil sensor 82, and the brake mechanism sensor 83. Alternatively the abnormality detection unit 80 may include other sensor in addition to one or more selected from the group consisting of the load sensor 81, the oil sensor 82, and the brake mechanism sensor 83. As the other sensor, for example, an anemometer may be used. The abnormality detection unit 80 may further include an anemometer that detects the degree of gust that may act on the meshing portion as an external force, and when the wind speed measured by the anemometer reaches a predetermined value or more, output of the drive force from the drive gear 24*a* of the driving device body 20 to the ring gear 107 may be stopped. In addition, when the wind speed measured by the anemometer reaches the predetermined value or more, a brake by the brake mechanism 50 on the rotation may be released.

Further, the abnormality detection unit 80 may include a sensor that monitors the control current of the electric motor 23. That is, when the control current of the electric motor 23 becomes excessive, the output of the driving force from the drive gear 24*a* of the driving device body 20 to the ring gear 107 may be stopped. Further, when the control current of the electric motor 23 becomes excessive, a brake the brake mechanism 50 on the rotation may be released.

Furthermore, configuration of the load sensor 81, the oil sensor 82 and the brake mechanism sensor 83 described above may be changed as appropriate. For example, the load sensor 81 is not limited to the sensor that detect the state quantity of the fastener 30 but may be any type of sensor capable of detecting any state quantity varying depending on a magnitude of a "load between the drive gear 24*a* and the ring gear 107." For example, a sensor capable of measuring an amount of a force acting on the reducer 25 (for example, a sensor for detecting a distortion generated in the reducer 25) can be installed in the reducer 25 of each of the driving devices 10 and this sensor may be used as the load sensor 81.

Furthermore, in the above-described embodiment, an example is described in which the output of the driving force is stopped by stopping the power supply to the motor 23 when the abnormality detection unit 80 detected an abnormality. For example, a clutch mechanism 85 (see FIG. 4) may be provided between the electric motor 23 and the reducer 25 to switch between power transmission and shut-off. When an abnormality is detected, the clutch mechanism 85 may be released to interrupt the power transmission to the reducer 25 from the electric motor 23, and thereby the output of the driving force from the drive gear 24*a* to the ring gear 107 may be stopped.

Furthermore, in the embodiment described above, the brake mechanism is configured as the motor drive unit 48 that is incorporated in the electric motor 23 and brakes the rotation of the drive shaft 48*a* of the motor drive unit 48. However, the invention is not limited to this, and the brake mechanism may be a mechanism that brakes the rotation of one or more selected from the group consisting of any component of the reducer 25, the output shaft 24, and the drive gear 24*a*.

Furthermore, in the above-described embodiment, a brake by the brake mechanism 50 on rotation is released when the abnormality detection unit 80 detected an abnormality. However the invention is not limited thereto. Alternatively, the interlocking between the component whose rotation is braked by the brake mechanism 50 and the drive gear 24*a* may be released when the abnormality detection unit 80 detected an abnormality. Specifically, in the above-described embodiment, the clutch mechanism 85 (see FIG. 4) may be provided between the drive shaft 48*a* and the drive gear 24*a* whose rotation is braked by the motor brake unit 50, and the interlock between the drive shaft 48*a* and the drive gear 24*a* may be released when an abnormality is detected. Even in the above-described modification example, it is possible to achieve the same advantageous effects as those in the above embodiment.

What is claimed is:

1. A driving device, comprising:
a driving device body having a drive gear that is provided in one structure at a movable section of a wind turbine and meshes with a ring gear provided in another structure at the movable section of the wind turbine and a brake mechanism configured to brake rotation transmitted to the drive gear or rotation output from the drive gear; and
an abnormality detection unit for monitoring at least one selected from the group consisting of a load applied to a fastener fixing the driving device body to the one structure, a displacement of the fastener with respect to the one structure, a relative position of the fastener to the one structure, the color of oil inside the driving device body, water content of the oil inside the driving device body, a displacement of a component included in the driving device body, and a load occurred on the component included in the driving device body,
wherein output from the drive gear of the driving device body to the ring gear is stopped and a brake by the brake mechanism on rotation is released when the abnormality detection unit detected an abnormality.

2. A driving device, comprising:
a driving device body having a drive gear and a brake mechanism, the drive gear being provided in one structure at a movable section of a wind turbine and meshing with a ring gear provided in another structure at the movable section of the wind turbine, and the brake mechanism braking rotation transmitted to the drive gear or rotation output from the drive gear; and
an abnormality detection unit for monitoring operation of the brake mechanism,
wherein output of a drive force from the drive gear of the driving device body to the ring gear is stopped and a brake by the brake mechanism on rotation is released when the abnormality detection unit detected an abnormality.

3. A driving device unit, comprising:
a plurality of driving devices provided in a single movable section of a wind turbine,
wherein each of the plurality of driving devices is the driving device of claim 1,
wherein the abnormality detection unit is separately provided for each driving device,
wherein, when one abnormality detection unit detected an abnormality, output to the ring gear from the drive gear in the driving device having the abnormality detection unit which detected the abnormality is stopped, and output to the ring gear from the drive gear(s) in the driving device(s) other than the driving device having the abnormality detection unit which detected the abnormality is also stopped.

4. The driving device unit of claim 3, wherein when one abnormality detection unit detected an abnormality, a brake by the brake mechanism on rotation is released in the driving device having the abnormality detection unit which detected the abnormality, and a brake by the brake mechanism(s) is released also in the driving device(s) other than the driving device having the abnormality detection unit which detected the abnormality.

5. A wind turbine comprising the driving device of claim 1.

6. A driving device unit, comprising:
a plurality of driving devices provided in a single movable section of a wind turbine,
wherein each of the plurality of driving devices comprises:
a driving device body having a drive gear and a brake mechanism, the drive gear being provided in one structure at a movable section of a wind turbine and meshing with a ring gear provided in another structure at the movable section of the wind turbine, and the brake mechanism braking rotation transmitted to the drive gear or rotation output from the drive gear; and an abnormality detection unit for monitoring operation of the brake mechanism, wherein output of a drive force from the drive gear of the driving device body to the ring gear is stopped when the abnormality detection unit detected an abnormality, wherein the abnormality detection unit is separately provided for each driving device, wherein, when one abnormality detection unit detected an abnormality, output to the ring gear from the drive gear in the driving device having the abnormality detection unit which detected the abnormality is stopped, and output to the ring gear from the drive gear(s) in the driving device(s) other than the driving device having the abnormality detection unit which detected the abnormality is also stopped.

7. The driving device unit of claim 6, wherein, when one abnormality detection unit detected an abnormality, a brake by the brake mechanism on rotation is released in the driving device having the abnormality detection unit which detected the abnormality, and a brake by the brake mechanism(s) is released also in the driving device(s) other than the driving device having the abnormality detection unit which detected the abnormality.

8. A wind turbine comprising the driving device of claim 2.

9. A wind turbine comprising the driving device unit of claim 3.

10. A wind turbine comprising the driving device unit of claim 6.

\* \* \* \* \*